Sept. 15, 1964  J. M. HESS  3,148,904
GATE LATCH

Filed July 28, 1961  2 Sheets-Sheet 1

INVENTOR.
JOHN M. HESS
BY
*Philip H. Sheridan*
ATTORNEY

Sept. 15, 1964 J. M. HESS 3,148,904
GATE LATCH
Filed July 28, 1961 2 Sheets-Sheet 2

INVENTOR.
JOHN M. HESS
BY
*Philip H. Sheridan*
ATTORNEY

United States Patent Office 3,148,904
Patented Sept. 15, 1964

3,148,904
GATE LATCH
John M. Hess, Boulder, Colo., assignor to The Delbar Company, Inc., Boulder, Colo., a corporation of Colorado
Filed July 28, 1961, Ser. No. 127,663
5 Claims. (Cl. 292—66)

This invention relates to a novel and improved form of latch specifically adapted for use as a gate closing device, and more particularly relates to a mechanical latch construction which requires positive release in opening gates and the like, yet is self-closing.

It is highly desirable to make provision for a simplified mechanical arrangement which requires positive actuation in releasing a gate from locked position, yet will automatically close under the closing force of the gate; and, where the arrangement is controlled in closing and opening between two accurately-defined positions so as to be dependable in operation. Moreover, it is highly advantageous to provide for a positive means of locking a gate in closed position, but which can be easily released for opening of the gate and will automatically return into positive locked engagement in the closed position merely under the closing force of the gate itself.

Accordingly, it is a principal and foremost object of the present invention to provide for a novel and improved gate closing device, entirely mechanical in structure, and which requires positive release in opening but is self-closing thereby to retain the gate in closed position at all times when not in use.

It is another object of the present invention to provide for a new and useful form of gate latch or closing device which is formed of a minimum number of parts, is simplified in construction and therefore easy and economical to manufacture; and moreover, a gate closing device which is of sturdy construction and dependable in operation.

It is a further object of the present invention to provide for a gate closing device which is conformable for mounting in desired relation with various types of gate or closure members so as to serve as a positive means of retaining a gate in closed position requiring positive release to an open position, yet which is easily movable back to the closed position under the influence of the closing force of the gate to automatically return to positive locked position.

In accordance with the present invention, the gate closing device is formed of conventional latch and mounting portions interconnected by a novel control mechanism for controlling the movement of a gate between open and closed positions. Specifically the control mechanism consists of a race having specially-designed slots adapted to receive a slot-engaging lug which in relation to a relatively deep slot will maintain the gate in positive locked position, but in relation to a relatively shallow slot corresponding to the open position can be easily returned to the locked position under the closing force of the gate; and, in association with the race and lug construction, a lever is so arranged as to be easily actuated for movement of the lug from locked position to the open position.

The above and other objects, advantages and features of the present invention will become more readily understood from the following detailed description taken together with the accompanying drawings, in which.

Figure 1:
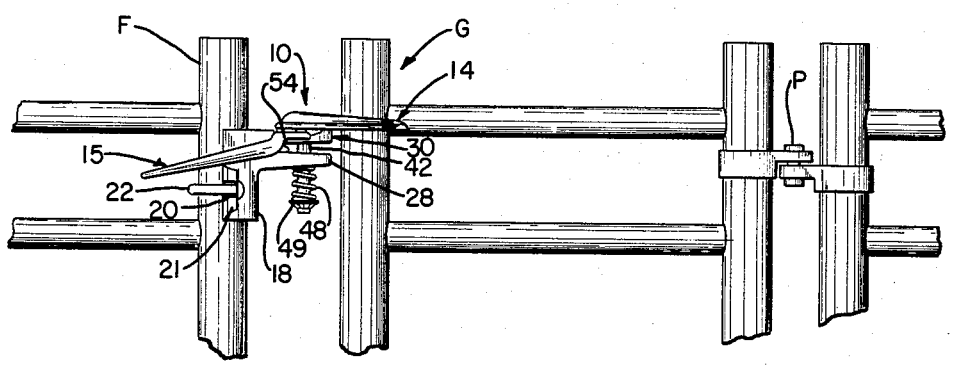
FIGURE 1 is a front view illustrating a typical mode of connecting the gate closing device of the present invention between a gate and fence post.
Figure 2:
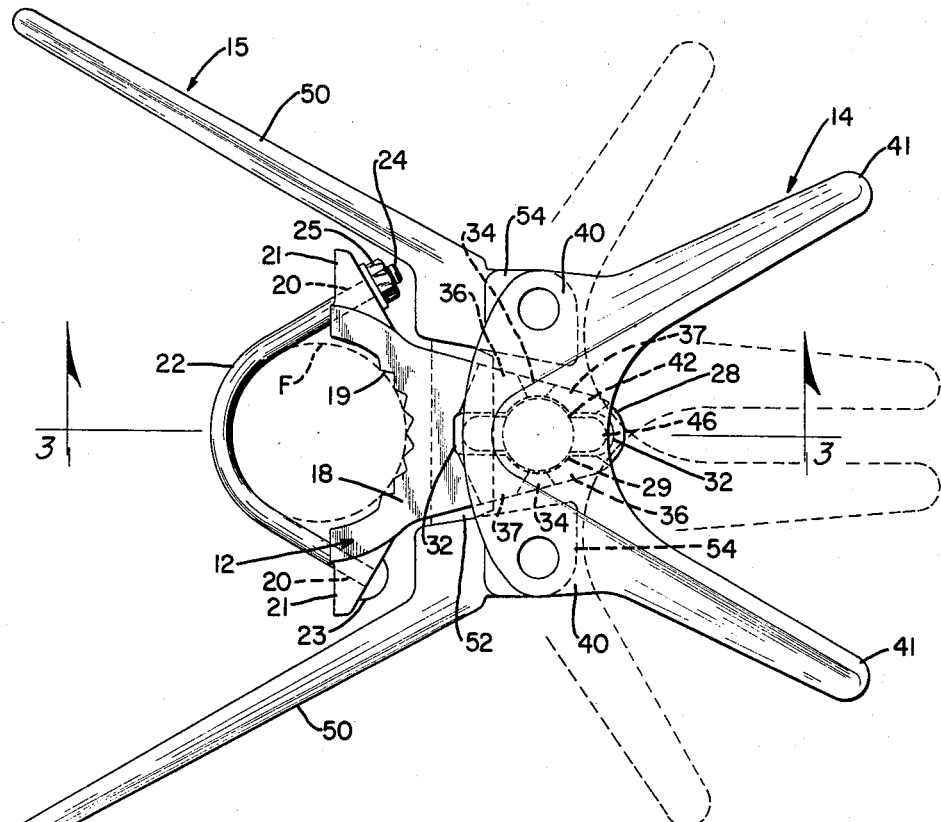
FIGURE 2 is a top plan view, in more detail, of the gate closing device, in accordance with the present invention.

Referring in detail to the drawings, there is shown by way of illustrative example in FIGURE 1 a preferred form of gate closing device 10 in interlocking relation between a fence post F and a gate G. As represented in the drawing, the gate G is of a conventional type, free to swing in either direction about the pivot P at one end with the closing device engaging the opposite free end of the gate to normally restrain its swinging movement. Broadly, the closing device 10 is made up of a stationary connecting portion 12 in the form of a suitable clamp which is secured to the post F, a latch member 14 in the form of a collar, and a lever 15 which in a manner to be described is adapted to control locking and release of the latch 14 in relation to the stationary connecting portion 12.

In more detail, the connecting portion 12 is in the form of a conventional clamp which will act to positively grip the post or supporting member F and in the preferred form is defined by a generally semi-cylindrical portion 18 which is striated or grooved as at 19 so as to establish positive gripping engagement with the post F. Bolt openings 20 are formed in wings 21 of the member 18 and a generally U-shaped bolt 22 has an enlarged head 23 at one end and a threaded portion 24 at the opposite end through which is secured a nut 25 so as to serve as an adjusting means of connection and clamping between the connecting portion 12 and the post F.

In order to provide for pivotal interconnection between the connecting portion 12 and the collar 14, a pair of bosses 28 project horizontally in vertical spaced relation away from the member 18 in a direction opposite the bolt 22 and each boss is provided with a vertical opening 29 therein. Additionally, the upper boss 28 has an upwardly facing annular race portion, generally indicated at 30, on its top surface in surrounding relation to the vertical opening 29. Preferably, each boss tapers forwardly and outwardly away from the main part of the member 18 so as to provide a rugged means of support for the collar 14 in attached relation to the connecting portion.

Specifically referring to the configuration of the race, as an important feature of the present invention, it includes a relatively deep slot 32 having vertical walls 33 extending the substantial depth of the boss and it being noted that the slot is acually defined by a pair of radial slotted portions in diametrically-opposed relation to the vertical opening and symmetrical about the main horizontal axis through the connecting portion and collar. In the top surface portion 34, a pair of relatively shallow slots 36 and 37 are formed at an approximate angle of 45° to the relatively deep slot. Here, it will be seen that each slot 36 and 37 is also defined by a pair of radial slotted portions in diametrically-opposed relation to the vertical opening, and each slotted portion is in the form of a slight depression in the top surface. Thus, the deep slot is sharply divided in approaching the flanking slots 36 and 37 by the walls 33, whereas the sides of the shallow slots in approaching the deep slot are formed on a gradual curvature along the top surface. In this way, the slot-engaging member must undergo an abrupt change in direction in moving from the deep slot to a relatively shallow slot 36 or 37. On the other hand, the slot-engaging member is permitted to undergo a gradual sliding movement in moving from the relatively shallow slot back to the deep slot, all this for an important purpose to be described.

The collar 14 is designed to cooperate with the connecting portion in establishing interlocking relation of the gate with the fence in the closed position and to this end, the collar consists of a relatively broad top portion 40 having horizontally-extending divergent arms 41 to embrace the free end of the post, and a vertical pivot pin 42 extends vertically and downwardly from the top 40 for insertion through the openings 29 in the bosses. The top portion 40 also has a flat undersurface 44, and a lug or slot-engaging member 46 is formed thereon which extends in a radial direction from diametrically opposite sides of the pin along the undersurface of the top 40; in cross-section, the lug corresponds to the cross-sectional shape of the slots 32 and is similarly arranged in symmetrical relation about the main axis through the collar. In order to normally urge the lug into engagement with the deep slot 32, resilient means in the form of a compression spring 48 is positioned over the lower end of the pin 42 and is held in abutting relation against the undersurface of the lower boss 28 by means of a clip 49 positioned at the lower extremity of the pin. The spring is tensioned so as to extert a downward force against the clip and pin, thus urging the lug downwardly into firm engagement with the slot 32. Due to the configuration of the relatively deep slot and its alignment with the main axis of the closing device, in the relation described the arms 41 will normally be retained in stationary relation against pivoting thus securely holding the free end of the gate against swinging movement.

In order to release the arms for pivotal movement, the lever 15 is positioned to oppose the urging of the resilient means 48 to effect release of the slot-engaging member or lug 46 upwardly from the slot 32 so that the collar will be free to pivot angularly in either direction away from the locked position to a position in alignment with a relatively shallow slot 36 or 37. For this purpose, the lever consists of a pair of spaced angularly and downwardly extending arms 50 interconnected by a fulcrum in the form of a cam member 52 and with dogs 54 defining forward horizontal continuations of the arms directely beneath the undersurface 44 of the collar. The cam member 52 is positioned between the bosses 28 and has a relatively broad rounded edge portion 55 conforming in configuration with rounded surface 55' between the bosses and with the cam tapering forwardly therefrom so as to be free to rock upwardly and downwardly about its rounded back edge in response to movement of the lever arms. A positive downward force exerted upon the lever arms will cause the cam to move from the position indicated in FIGURE 3 to that indicated in FIGURE 4 with the dogs simultaneously pivoting upwardly against the undersurface of the top 40 thereby causing the lug 46 to move out of engagement with the deep slot and to clear it for pivotal movement in either angular direction.

Figure 3:
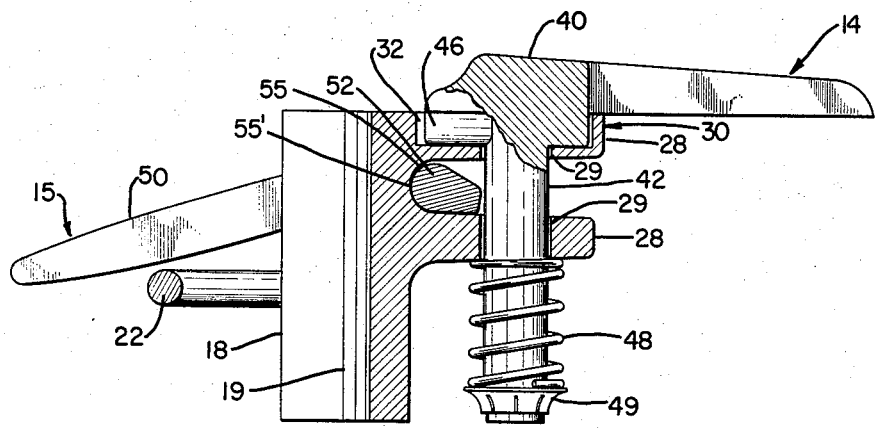
FIGURE 3 is a front view, partially in section, illustrating the relative disposition between parts of the closing device in the closed position.
Figure 4:
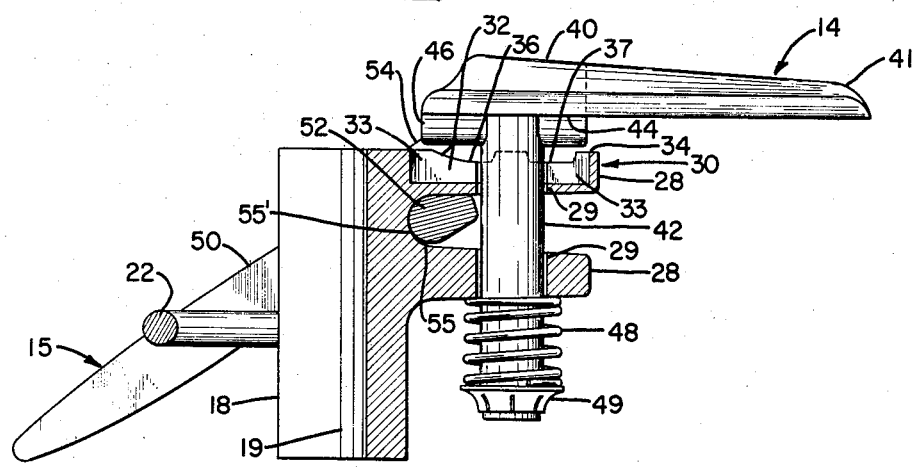
FIGURE 4 is a view similar to FIGURE 3 showing the relative disposition between parts of the closing device in the released position.
Figure 6:
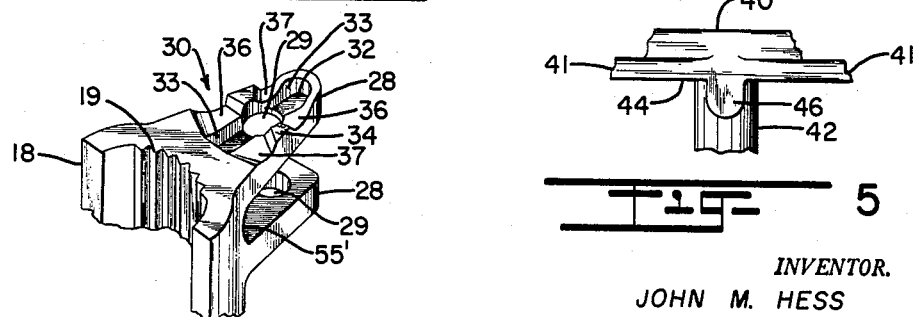
FIGURE 6 is a fragmentary perspective view in detail of a preferred form of race employed in accordance with the present invention.
Figure 5:
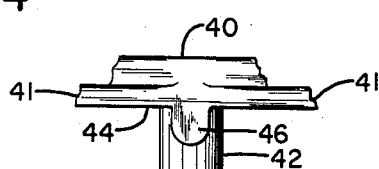
FIGURE 5 is a fragmentary end view of the top collar or latch portion of the device.

In operation, assuming that the closing device is in closed relation as in FIGURE 1 or FIGURE 3 holding the free end of the gate in locked position and with the arms 41 embracing the free end, downward actuation of the lever 15 will of course cause release of the collar so that upon movement of the gate in either direction away from locked relation, the arms 41 will also swing with the gate until the free end of the gate clears one end of the leading arm. At this position, the angular extension of the arms is so related to the disposition of the shallow slots that the lug will be aligned with the shallow slots and upon release of the lever arms, the lug will fall into engagement with the shallow slots to retain the arms in the open position. In this way, in closing, the free end of the gate will return to a position between the arms 43 and due to the relatively shallow depth of the angular slot, the weight of the gate in closing will be sufficient to easily urge the lug to travel over the curved top surface of the slot until it drops into the relatively deep slot as urged by the spring 48. Thus, through a simple mechanical arrangement where the depth of the slot is related to the opening and closing force of the gate, the latter will be sufficient to cause automatic closing of the collar thus locking the gate in desired relation. Also, the shallow slots are of sufficient depth to retain the arms in desired relation until the gate engages the arms as it swings toward the closed position and to insure that the collar will always return the gate to the locked position. Thus of primary importance is the particular arrangement and configuration of the race and lug assembly in association with the formation of the collar and of course various alterations may be made in the particular type of actuating or lever means as well as in the particular form of connecting portion or collar. For example, in opening and closing of the gate in one direction only, it would be necessary to employ a single shallow slot. Moreover, the closing device is conformable for use in a number of different applications and for instance could be stationed with slight modification between the pivotal end of the gate and the fence as well as the free end as described.

It is therefore to be understood that various modifications and changes may be made in the construction and arrangement of parts of the present invention without departing from the spirit and scope thereof as defined by the appended claims.

What is claimed is:

1. In a gate latching device for controlling unlatching and latching of a gate, said device having a latch member and connecting member pivotally secured together, the combination of a control mechanism interconnecting said latch and connecting members comprising an annular race on one member including a vertical opening with a relatively deep slot on said race corresponding to the closed position of said gate and at least one angular relatively shallow slot on said race axially spaced from and flanking said deep slot corresponding to the open position of the gate, a pivot pin having at least one gate latching member extending angularly therefrom and mounted on the other of said members for extension through the opening for rotation therein, a slot-engaging lug carried by said pin, and resilient means acting on said lug in relation to said race normally urging said lug into positive engagement with said slots, and a lever between said latch and connecting member movable in a direction to oppose the urging of said bias means thereby to provide for release of said lug from the relatively deep slot in order to permit movement of the lug to the open position in the shallow slot, the depth of the shallow slot being sized to allow release of said lug therefrom for return to the deep slot under the closing force of the gate.

2. In a gate latching device for controlling unlatching and latching of a gate, said device having a latch member and connecting member pivotally secured together, the combination of a control mechanism interconnecting said latch and connecting members comprising an upwardly facing annular race on said connecting member including a vertical opening and a relatively deep slot on said race extending radially beyond the periphery of said opening and corresponding to the closed position of said gate and at least one angular relatively shallow slot on said race formed in the edge of the wall of said slot, axially displaced from said deep slot and corresponding to the open position of the gate, a pivot pin on said latch member for extension through the opening with a radial slot-engaging lug, said pin having at least one gate latching member extending angularly therefrom, biasing means acting on said lug in relation to said race normally urging said lug into positive engagement with one of the slots, and a lever movable in a direction to oppose the urging of said biasing means being interposed between said race and lug thereby to provide for release of said lug from the relatively deep slot in order to permit movement of the lug to the open position in the shallow slot with rotation of said pivot pin and latching members by movement of the gate from the closed position, the depth of the shallow slot being sized to allow release of said lug therefrom for return to the deep slot under the closing force of the gate.

3. A gate closing device for controlling release and closing of a gate comprising a connecting member including a pair of horizontally extending bosses arranged in spaced vertical relation with vertical aligned openings therein, an upwardly facing, annular race on the upper boss in surrounding relation to the vertical opening having a relatively deep slot corresponding to the closed position of said gate and at least one angular relatively shallow slot on said race corresponding to the open position of the gate, a latch member having spaced divergent arms to receive the free end of the gate therebetween and a pivot pin extending through the aligned openings with a slot-engaging lug thereon, a spring on said pin normally urging said lug into positive engagement with one of the slots, and a lever including a pair of spaced lever arms and dog portions forming continuations of said lever arms to engage the undersurface of said latch, and a cam interconnecting said lever arms and resting between said bosses so as to be movable in a direction to oppose the urging of said spring thereby to initiate release of said lug from the relatively deep slot for movement to the open position in the shallow slot, the depth of the shallow slot being sized to allow release of said lug therefrom for return to the deep slot under the closing force of the gate.

4. A gate closing device according to claim 3, said slots each being defined by radial slotted portions in diametrically opposed surrounding relation to the vertical opening, the shallow slotted portions being disposed at substantially 45° to the deep slotted portions, and said slot-engaging lug having radial portions in diametrically opposed relation to the pivot pin corresponding in size and shape to the deep slotted portions.

5. In a gate latching device for controlling latching and unlatching of a gate, said device having a latch member and connecting member pivotally secured together, said connecting member having a pair of bosses disposed in vertical spaced relation with aligned openings for reception of a pivot pin, an annular race being formed in the upper boss including a vertical opening and a relatively deep slot on said race corresponding to the closed position of said gate and at least one angular relatively shallow slot on said race corresponding to the open position of the gate, a pivot pin on said latch member for extension through said opening having a radial slot-engaging lug for contact with said annular race, biasing means acting on said lug in relation to said race normally urging said lug into positive engagement with one of said slots, and a lever having its fulcrum disposed between said bosses and at least one dog defining forward continuation of said lever contacting the undersurface of said latch member, said lever being movable in a direction to oppose the urging of said biasing means interposed between said race and lug thereby to provide for release of said lug from the relatively deep slot in order to permit movement of the lug to the open position in the shallow slot, the depth of the shallow slot being sized to allow release of said lug therefrom for return to the deep slot under the closing force of the gate.

References Cited in the file of this patent
UNITED STATES PATENTS

| | | |
|---|---|---|
| 1,258,624 | Swank | Mar. 5, 1918 |
| 1,280,665 | Clay | Oct. 8, 1918 |
| 2,666,660 | Youngworth | Jan. 19, 1954 |